United States Patent Office 3,486,735
Patented Dec. 30, 1969

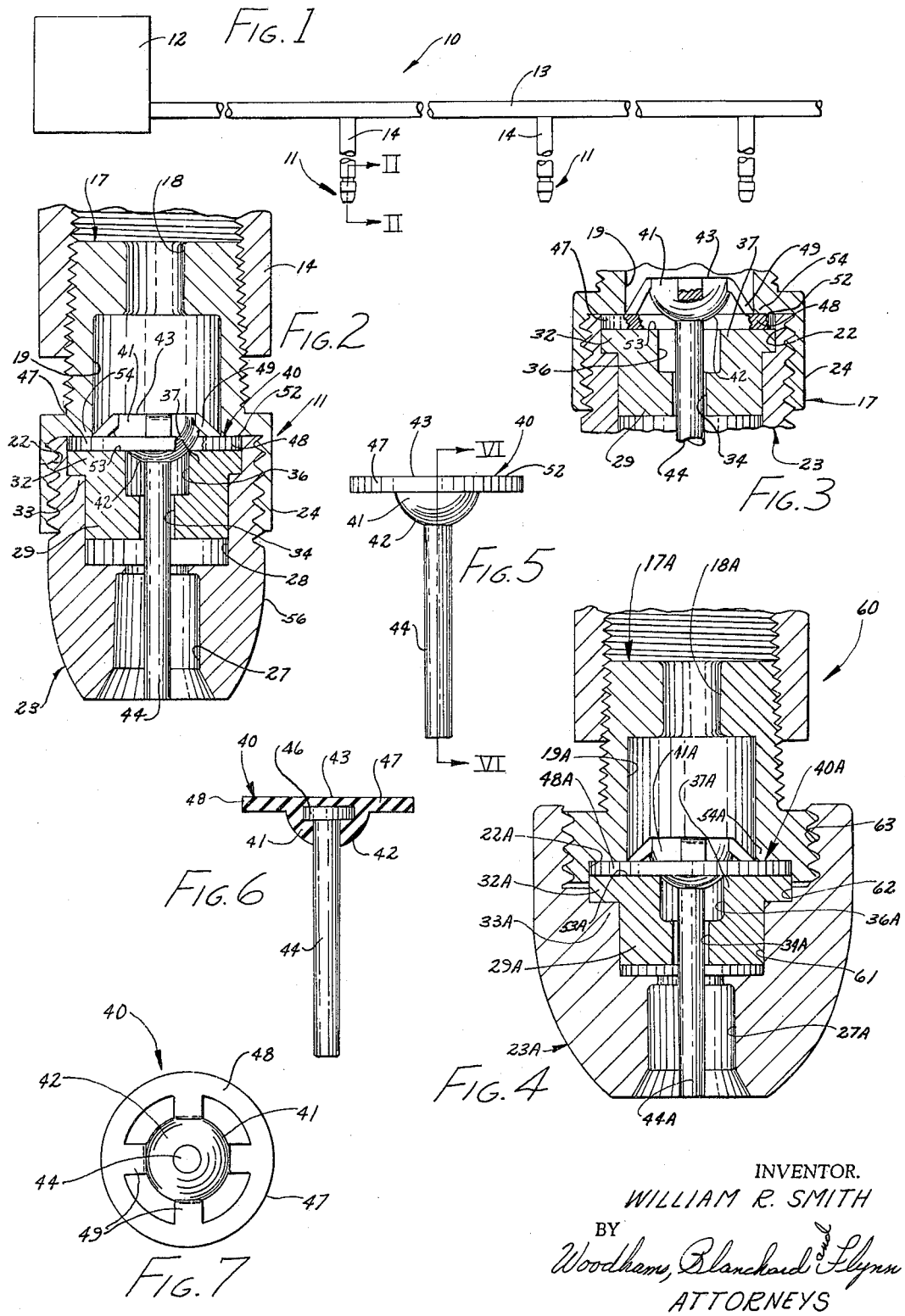

3,486,735
ANIMAL ACTUATED DRINKING VALVE
William R. Smith, Kalamazoo, Mich., assignor to The Upjohn Company, Kalamazoo, Mich., a corporation of Delaware
Filed Sept. 11, 1967, Ser. No. 666,713
Int. Cl. F16k 1/16; B65d 83/06
U.S. Cl. 251—303                                5 Claims

ABSTRACT OF THE DISCLOSURE

A valve assembly having inlet and outlet body parts and a valve device including a valve head and valve seat disposed within a passageway extending through the valve body parts. The valve head is connected to resiliently flexible means clamped between the two body parts so that the valve head is yieldingly held in the closed position against the valve seat.

BACKGROUND OF THE INVENTION

This invention relates in general to a valve assembly for controlling the flow of fluids and, more particularly, to a type of valve assembly through which the flow of a liquid can be controlled by an animal, such as a small rodent, in response to the animal's demand for such liquid.

A number of animal-actuated, liquid-flow control valve assemblies have been developed, particularly for use in research laboratories, and two of such valve assemblies are disclosed in Patent No. 3,008,451 entitled, "Animal Drinking Valve" and in Patent No. 3,215,119 entitled, "Animal Drinking Fount." While many of these valve assemblies, including the two aforementioned assemblies, have served specific purposes, there has yet remained the need for a valve construction having a positive closing action (not reliant upon gravity and/or the liquid pressure for proper closing). For example, a valve assembly having positive closing means can be used in substantially any position. Moreover, where several such valve assemblies are connected to the same supply system and a failure occurs in the pressure providing the supply, the valve remains closed.

Accordingly, a primary object of this invention is the provision of an improved valve assembly capable of animal actuation wherein the valve head is positively and resiliently held by integral means in closing engagement with a valve seat so that it can be unseated by the animal to permit the flow of a liquid.

A further object of this invention is the provision of a valve device including a valve head and valve stem integral with resilient means for centering the valve head and holding it in the closed position with respect to a valve seat in order to simplify and minimize the cost of manufacturing and/or maintaining a valve assembly including said valve device.

Other objects and purposes of the invention will become apparent to persons familiar with this type of equipment upon reading the following descriptive material and examining the accompanying drawings, in which:

FIGURE 1 is a broken, partially schematic view of a fluid supply system including valve assemblies embodying the invention.

FIGURE 2 is a sectional view, partially broken away and taken along the line II—II in FIGURE 1.

FIGURE 3 is a broken fragment of FIGURE 2 showing the valve device in a different position of operation.

FIGURE 4 is a sectional view similar to that appearing in FIGURE 2 and showing an alternate valve assembly.

FIGURE 5 is a side elevational view of the valve device employed in the valve assemblies of FIGURES 2 and 4.

FIGURE 6 is a cross-sectional view substantially as taken along the line VI—VI in FIGURE 5.

FIGURE 7 is a bottom view of the valve device shown in FIGURE 5.

For convenience in description, the terms "front," "rear" and words of similar import will have reference to the lower and upper ends, respectively, of the valve assemblies appearing in FIGURES 2 and 4. The terms "inner," "outer" and words of similar import will have reference to the geometric center of said valve assemblies and parts thereof.

SUMMARY OF THE INVENTION

The objects and purposes of the invention, including those set forth above, have been met by providing a valve assembly comprising first and second, substantially cylindrical body parts which are coaxially and removably connected to each other at adjacent ends. Said parts have coaxial passageways enlarged and communicating at their adjacent ends. A valve seat, which can be an annular insert or integral with the second body part, is provided and disposed within the enlarged portion of the passageway in the second body part. A valve device is comprised of a valve stem extending from a valve head which is integral with a wheel-shaped, resiliently flexible member clamped between the second body part and/or the insert therein and the first body part at their adjacent ends whereby the valve head is yieldably held in the closed position while exerting a positive bias against the valve seat.

DETAILED DESCRIPTION

A liquid supply system 10 (FIGURE 1), with which the valve assembly 11 of the invention may be used, includes a source 12 of liquid, such as water, under pressure, a main supply line 13 and a plurality of branch lines or pipes 14 connected to the supply line 13.

The valve assembly 11 (FIGURE 2) is comprised, in one preferred embodiment, of a first or rear body part 17 which is preferably substantially cylindrical and is externally threaded at its rearward end for threaded engagement with internal threads on the branch pipe 14. The rear body part 17 has a coaxial inlet passageway 18 with a central enlarged portion 19 and a front enlarged portion 22 having a larger diameter than the central enlarged portion 19. The front enlarged portion is internally threaded for threaded engagement with external threads at the rearward end of the second or front body part 23. The peripheral surface 24 at the frontward end of the rear body part 17 may be knurled or provided with an out-of-round cross section to facilitate gripping thereof when it is connected to the branch pipe 14. Similarly, the peripheral surface 56 of the second or front body part 23 may be knurled or the like to facilitate assembly and disassembly for cleaning.

The front body part 23 has a coaxial outlet passageway 27 which has an enlarged portion 28 at its rearward end adjacent to an opening toward the enlarged portion 22 in the rear body part 17. An optional annular insert 29 is snugly disposed within the enlarged portion 28 so that the integral flange 32 of the insert 29 bears against the rearwardly facing shoulder 33 of the front body part 23. Said annular insert 29 has a coaxial opening 34 with an enlarged rearward portion 36, the walls of which define a relatively sharp and annular valve seat 37 adjacent the rearward face of the flange 32.

The valve device 40 is comprised of a resilient valve head 41 preferably having a hemispherical surface 42 adapted to sealingly engage the valve seat 37. Said valve device 40 has a valve stem 44 which preferably extends through and radially away from the central portion of the surface 42. As shown in FIGURE 6, the valve stem has an integral external flange 46 or the like on its rearward end which is embedded in the material forming the valve head 41. The valve stem may be fabricated from any suitable material, such as metal or a relatively rigid plastic.

The valve device 40 includes a resiliently flexible and wheel-shaped member 47 having an outer ring 48 of rectangular or other cross-sectional contour and a plurality of radially disposed and resiliently flexible elements 49 which are preferably integral with and extend between the ring 48 and the valve head 41. In this embodiment, the valve head 41, the elements 49 and the ring 48 are formed, as by molding, from an elastomeric material such as rubber, either natural or synthetic, silicone rubber, or other suitable material. In the unstressed condition of FIGURES 5 and 6, the rearward surface 52 of the ring 48 is substantially coplanar with the base 43 of the valve head 41, but other specific arrangements are contemplated.

The ring 48 (FIGURE 2) is of such size and shape that it can be firmly clamped between the rearward face 53 of the annular insert 29, or the like, and the frontwardly facing shoulder 54 extending between the front end of the central enlarged portion 19 and the rear end of the front enlarged portion 22 in the passageway 18. Thus, the ring 48 serves not only to position the valve head 41 properly against the valve seat 37, but also to prevent leakage of liquid from the central enlarged portion 19 into the outlet passageway 27 when the valve head 41 is seated. Accordingly, liquid can move from the inlet passageway 18 into the outlet passageway 27 only through the opening 34 in the annual insert 29 when the valve head 41 is spaced from the valve seat 37, as shown in FIGURE 3.

The valve head 41 is held against the valve seat 37 by the resiliently flexible elements 49 which, as shown in FIGURE 2, are under tension and thus exert a positive bias against valve seat 37 when the ring 48 is clamped between the shoulder 54 and the insert 29. Thus, as shown in FIGURES 2 and 3, a substantial portion of the valve head 41 is disposed within the central enlarged portion 19 of the inlet passageway 18 when the valve head 41 is seated. Moreover, additional room is provided within said central enlarged portion 19 for reception of the valve head 41 when it is unseated, as shown in FIGURE 3.

The cross-sectional area of the valve stem 44 is substantially smaller than the cross-sectional areas of the opening 34 in the insert 29 and of the outlet passageway 27 to permit the flow of liquid therethrough when the valve head 41 is held away from the valve seat 37.

The length of the valve stem 44 is not critical, as long as it can be reached and operated by the type of animal to be serviced.

ALTERNATE CONSTRUCTION

The valve assembly 60 (FIGURE 4) is in general similar to the valve assembly 11 and, accordingly, corresponding parts of the assembly 60 will carry the same numerical designations as their counterparts in the assembly 11 with the suffix "A."

The assembly 60 comprises a rear body part 17A which is externally threaded at its rearward end for reception into a branch pipe 14. The front end of the rear body part 17A is externally threaded for engagement wth the internal threads at the rearward end of the front body part 23A. The rear body part 17A has an inlet passageway 18A with central and front enlarged portions 19A and 22A, respectively.

The front body part 23A has a coaxial outlet passageway 27A which includes a series of graduated, enlarged portions 61, 62 and 63, the last of which is internally threaded for engagement with the rear body part 17A. The annular insert 29A is snugly disposed within the enlarged portion 61 and includes an external flange 32A at its rearward end which is partially disposed within the enlarged portion 62. The flange 32A is of such axial extent that it projects axially into the front enlarged portion 22A of the inlet passageway 18A when the flange 32A bears against the shoulder 33A between the portions 61 and 62 of passageway 27A. Thus, the ring 48A on the valve device 40A can be firmly clamped between the rear face 53A of the annular insert 29A and the shoulder 54A in the rear body part 17A.

The valve device 40A may be identical with the valve device 40 except that the valve stem 44 may be somewhat shorter, if desired, due to the manner in which the front and rear body parts 23A and 17A, respectively, are interconnected. The stem 44A extends through the opening 34A in the insert 29A and to the frontward end of the outlet passageway 27A to the point where it can be engaged by the animal to open the valve. The cross-sectional area of the stem 44A is sufficiently smaller than the cross-sectional areas of the opening 34A and the passageway 27A as to permit the flow of liquid therethrough when the valve head 41A is spaced from the valve seat 37A.

OPERATION

The operation of the valve assembly 11 and/or the valve assembly 60 is readily apparent to the skilled artisan from the foregoing description thereof so that the following is primarily a summary of such operation. Liquid, such as water, is supplied from a source 12 (FIGURE 1) under suitable pressure into the main supply line 13 and thence through the branch pipes 14 within the inlet passageway 18 adjacent the valve head 41. The water pressure cooperates with the resilient flexibility of the elements 49 in the valve device 40 to urge the valve head 41 snugly against the valve seat 37 and thereby positively prevent the flow of the liquid through the opening 34 into the outlet passageway 27. The ring 48 on said valve device 40 serves as a liquid-tight gasket to prevent the escape of the liquid between the rear body part 17 and the adjacent rear face 53 of the insert 29.

The valve stem 44 preferably extends to the frontward end of the front body part 23 so that it can be engaged by the nose or foot of an animal, such as a rodent, when it wishes to obtain some of the liquid. Generally speaking, a small amount of movement of the valve stem 44, particularly in a rearward and axial direction, will unseat the valve head 41 so that said liquid can move past the valve head and thence through the opening 34 into the outlet passageway 27 where it can be ingested by the animal. As soon as the animal's needs for the liquid have been satisfied and, therefore, he releases or ceases to move the stem 44, the valve head 41 immediately reseats itself within the valve seat 37 due to the tension on the elements 49. This closing movement is enhanced in a well-known manner by the low pressure zone created when the liquid passes through the region between the adjacent portions of the valve seat 37 and the valve head 41.

Due to the resilient flexibility of the elements 49, the valve head 41 will be held firmly and sealingly against the valve seat 37, even where there is a decrease or a failure in the water pressure urging the liquid against the valve head 41.

If a valve device 40 needs replacing or cleaning, disassembly of the valve assembly 11 can be quickly and easily effected merely by depressurizing the system and then by disconnecting the front body part 23 from the rear body part 17 after which the insert 29 and valve device 40 are quickly and easily removed from the front body part 23. Thus, the entire assembly 11 comprises four relatively simple parts which minimize maintenance while affording the positive closing of the valve head 41 against the seat 37 as desired.

The operation of the valve assembly 60 is, in substance, identical with that described above with respect to the valve assembly 11.

The embodiments of the invention in which an exclusive property or privilege is claimed are defined as follows:

1. An animal-actuated valve assembly comprising:

a rear body part having an inlet passageway therethrough;

a front body part having an outlet passageway therethrough, said front body part having a rigid annular valve seat near to, and concentric with the rearward end of said outlet passageway;

means for connecting the rear end of said front body part and the front end of said rear body part together, said inlet and outlet passageways being in communication;

a resiliently flexible valve head having a curved convex surface adapted to engage said rigid valve seat for normally preventing flow through said outlet passageway;

a resiliently flexible annulus sealingly clamped between adjacent annular portions of said front and rear body parts;

resiliently flexible and spaced elements integral with and extending between said valve head and said annulus, said flexible elements yieldably urging said valve head against, and in sealing engagement with, said rigid valve seat; and a valve stem secured at its rear end to said valve head and extending therefrom along said outlet passageway, at least a part of the lateral surface of said stem being spaced throughout the length thereof from the wall defining said outlet passageway for permitting flow therebetween, and the front end of said valve stem being accessible for movement by an animal to unseat said valve head.

2. A valve assembly according to claim 1, wherein said curved surface on said valve head is a portion of a sphere.

3. A valve assembly according to claim 1, wherein said outlet passageway has a portion of enlarged diameter adjacent its rearward end; and wherein said front body part includes an annular flanged insert disposed within the enlarged portion of said outlet passageway and said insert having a concentric opening defined at its rearward end by said rigid valve seat, said annulus being clamped between said portion of said rear body part and the flange of said annular insert.

4. A valve assembly according to claim 1, wherein said valve head has a substantially hemispherical and frontwardly facing surface in substantially concentric and axial alignment with the rearward end of said outlet passageway, said front body part having a shoulder thereon forming the rearward end of said outlet passageway and said rigid valve seat, said hemispherical valve head having a diameter greater than the diameter of said rearward end of said outlet passageway whereby said surface is resiliently maintained in sealing engagement with said shoulder.

5. An animal-actuated valve assembly for controlling the flow of liquid comprising:

a rear body part having an inlet passageway therethrough, said inlet passageway having a portion of enlarged diameter at the front end of said rear body part;

a front body part having an outlet passageway therethrough, said outlet passageway having a portion of enlarged diameter near the rear end of said front body part, the rearward end of said outlet passageway being defined by a rigid annular valve seat;

threaded means formed on said front and rear body parts adjacent the rear and front ends thereof, respectively, for fixedly connecting said front and rear body parts toegther, said inlet and outlet passageways being in substantially concentric communication;

a resiliently flexible valve head substantially disposed within at least one of the enlarged portions of said passageways for normally preventing the flow of liquid through said outlet passageway, said valve head having a rounded surface thereon adapted to sealingly engage said valve seat;

resiliently flexible annular means sealingly clamped between adjacent annular portions of said front and and rear body parts adjacent said valve seat and normally disposed in concentric and surrounding relationship to said valve head;

a plurality of resiliently flexible elements extending radially between and integrally connected to said annular means and said valve head, said elements yieldably urging said resilient valve head against said rigid valve seat, and said resiliently flexible elements being circumferentally spaced to define openings therebetween through which liquid can flow from said inlet passageway to said outlet passageway when said valve head is moved away from said valve seat; and an elongated valve stem positioned within, and extending substantially through, the length of said outer passageway, the rear end of said valve stem being secured to said valve head and the front end of said valve stem being exposed to movement by an animal for unseating said valve head, said valve stem having a cross-sectional area smaller than the cross-sectional area of said outlet passageway for permitting liquid flow therebetween.

References Cited

UNITED STATES PATENTS

| | | | |
|---|---|---|---|
| 957,347 | 5/1910 | Kennedy | 251 |
| 2,710,594 | 6/1950 | Thompson | 251—339 X |
| 2,805,003 | 9/1957 | Ayres | 222—402.25 |
| 3,272,403 | 9/1966 | Alexander | 251—353 X |
| 3,301,444 | 1/1967 | Wittke | 251—353 X |
| 3,355,143 | 11/1967 | Mueller | 251—321 |
| 3,401,849 | 9/1968 | Weber | 251—353 X |

HENRY T. KLINKSIEK, Primary Examiner

U.S. Cl. X.R.

222—402.25